United States Patent
Piccolo

(10) Patent No.: US 10,987,770 B2
(45) Date of Patent: Apr. 27, 2021

(54) CARTESIAN MACHINE TOOL WITH HORIZONTAL SLIDE AND CANTILEVERED MACHINING HEAD, AND SLIDE CARRIAGE FOR SUCH MACHINE TOOL

(71) Applicant: HPT SINERGY S.R.L., Padua (IT)

(72) Inventor: Gabriele Piccolo, Camposampiero (IT)

(73) Assignee: HPT SINERGY S.R.L., Padua (IT)

( * ) Notice: Subject to any disclaimer, the term of this patent is extended or adjusted under 35 U.S.C. 154(b) by 409 days.

(21) Appl. No.: 16/085,746

(22) PCT Filed: Mar. 15, 2017

(86) PCT No.: PCT/EP2017/056177
§ 371 (c)(1),
(2) Date: Sep. 17, 2018

(87) PCT Pub. No.: WO2017/158061
PCT Pub. Date: Sep. 21, 2017

(65) Prior Publication Data
US 2019/0047100 A1    Feb. 14, 2019

(30) Foreign Application Priority Data
Mar. 17, 2016  (IT) .................. 102016000027888

(51) Int. Cl.
*B23Q 1/62*    (2006.01)
*B23Q 11/00*    (2006.01)

(52) U.S. Cl.
CPC .......... *B23Q 1/626* (2013.01); *B23Q 11/0028* (2013.01)

(58) Field of Classification Search
CPC .......... B23Q 1/012; B23Q 1/262; B23Q 1/62; B23Q 1/621; B23Q 1/626; B23Q 1/25–628

(Continued)

(56) References Cited

U.S. PATENT DOCUMENTS 9,033,627 B2 *  5/2015  Mendia Olabarria ................. B23Q 11/0028
                                                                                409/238
2013/0202373 A1 *  8/2013  Hori .................. B23B 35/00
                                                                    408/11

FOREIGN PATENT DOCUMENTS

| CN | 102063090 A | 5/2011 |
| CN | 102470498 A | 5/2012 |

(Continued)

OTHER PUBLICATIONS

EP Third Party Observations issued Aug. 16, 2019 re: Application No. 17712438.5-1015/3429800, pp. 1-16, citing: CN103878645B and EP2390052B1.

(Continued)

*Primary Examiner* — Lee D Wilson
*Assistant Examiner* — Robert F Neibaur
(74) *Attorney, Agent, or Firm* — Cantor Colburn LLP

(57) ABSTRACT

A Cartesian machine tool, of the type with a horizontal slide and a machining head supported in a cantilever manner by the slide, includes a slide carriage, with respect to which the slide can move horizontally with corresponding elements of horizontal translation, and a post, which includes two opposite guiding columns for the vertical movement of the slide carriage with elements of vertical translation. The slide carriage includes a first front part coupled to the post with the elements of vertical translation and a second rear part coupled to the first part with elements of translation in a transverse direction with respect to a direction of motion of the slide with respect to the carriage.

11 Claims, 5 Drawing Sheets

(58) Field of Classification Search
USPC .......................................... 269/55, 60, 281.1
See application file for complete search history.

(56) References Cited

FOREIGN PATENT DOCUMENTS

| CN | 102797401 A | 11/2012 |
|---|---|---|
| CN | 103878645 B | 3/2016 |
| DE | 102013207125 A1 | 10/2014 |
| EP | 2390052 A1 | 11/2011 |

OTHER PUBLICATIONS

International Search Report dated Jun. 13, 2017 re: Application No. PCT/Ep2017/056177, pp. 1-3, citing: CN 103 878 645 B and DE 10 2013 207125 A1.
IT Search Report dated Nov. 11, 2016 re: Application No. IT UA20161742, pp. 1-7, citing: CN 103 878 645 B and DE 10 2013 207125 A1.
Written Opinion dated Jun. 13, 2017 re: Application No. PCT/Ep2017/056177, pp. 1-7, citing: CN 103 878 645 B.

* cited by examiner

CARTESIAN MACHINE TOOL WITH HORIZONTAL SLIDE AND CANTILEVERED MACHINING HEAD, AND SLIDE CARRIAGE FOR SUCH MACHINE TOOL

TECHNICAL FIELD

The present disclosure relates to a Cartesian machine tool, of the type with a horizontal slide and a machining head supported in a cantilever manner by the slide.

BACKGROUND

Nowadays machine tools are known of the type with a horizontal slide and a machining head supported in a cantilever manner by said slide, which typically comprise:

a slide carriage, with respect to which the slide can move horizontally according to a first direction with corresponding means of horizontal translation, and a post for moving, according to a second direction, the slide carriage vertically with means of vertical translation.

The post, furthermore, slides on a footing in a third direction, perpendicular to the other two.

Typically, the accuracy of such large-sized Cartesian machine tools (with excursion of the axes greater than 3 meters) is limited by structural deformations that affect the elements of the supporting frame and of the slide proper, and these deformations vary as a function of the excursion of the slide.

In order to correct the positioning errors owing to structural deformations of the elements of the slide, nowadays systems are known and used which act by making the sliding guides of the slide deform.

However, such systems have the severe drawback that they allow the introduction of geometric errors that can then be difficult to control during detection and correction.

SUMMARY

The aim of the present disclosure is to provide a Cartesian machine tool that is capable of restoring the correct configuration of a machining head, without deforming the sliding guides of the slide, and in general without introducing deformations into the means of guiding the movable elements of the machine.

Within this aim, the disclosure provides a Cartesian machine tool in which the position of the machining head can be rapidly corrected with respect to any deviations with respect to a preset position.

The disclosure further provides a Cartesian machine tool with operational performance levels that are not lower than conventional Cartesian machine tools.

The disclosure also provides a slide carriage for a Cartesian machine tool as per the main aim.

This aim and these and other advantages which will become better evident hereinafter are achieved by providing a Cartesian machine tool, of the type with a horizontal slide and a machining head supported in a cantilever manner by said slide, according to claim 1, and also by a slide carriage according to claim 11.

BRIEF DESCRIPTION OF THE DRAWINGS

Further characteristics and advantages of the disclosure will become better apparent from the detailed description that follows of a preferred, but not exclusive, embodiment of the Cartesian machine tool according to the disclosure, which is illustrated for the purposes of non-limiting example in the accompanying drawings wherein.

DETAILED DESCRIPTION OF THE DRAWINGS

Figure 1:
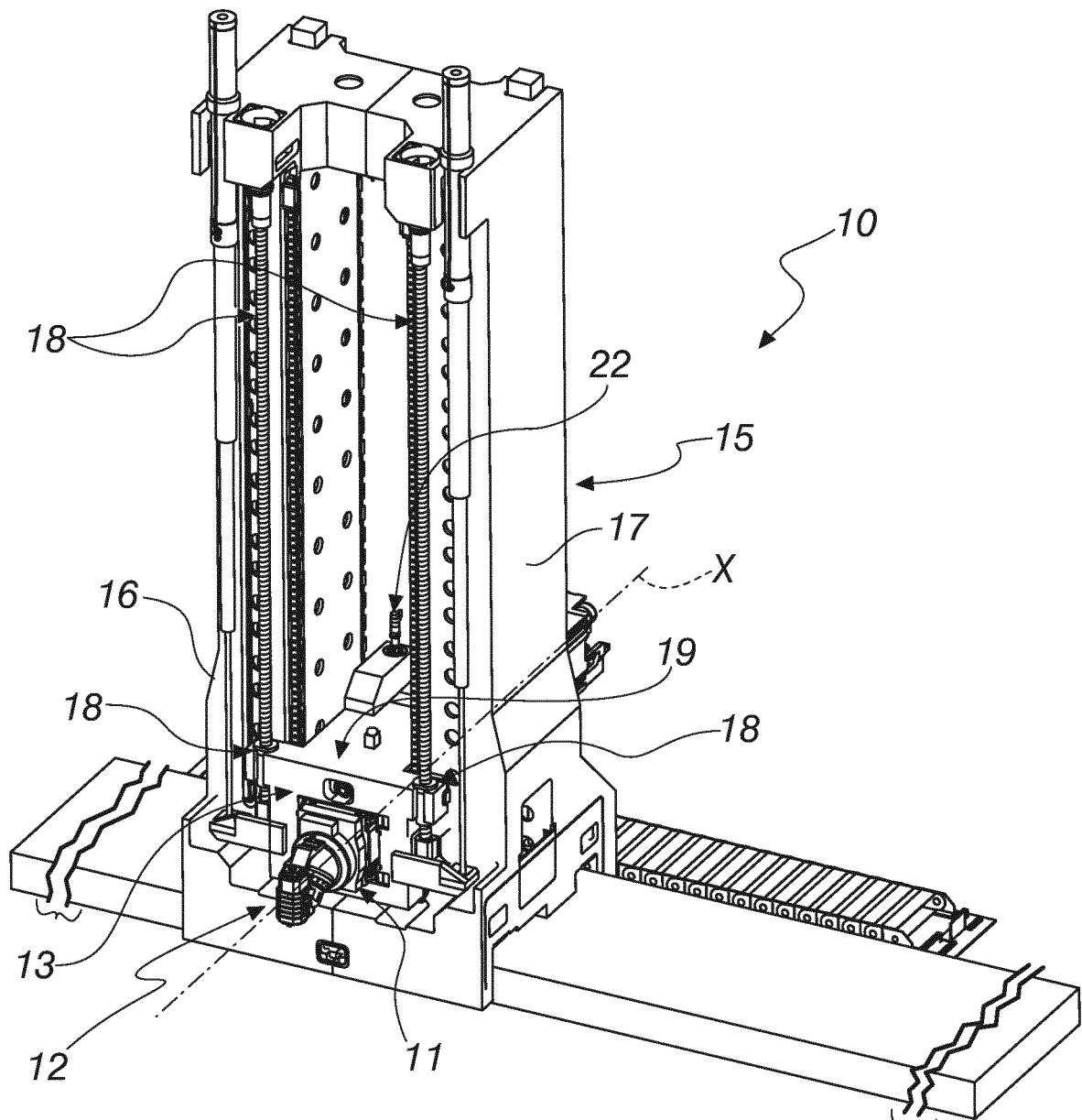
FIG. 1 is a perspective view of a Cartesian machine tool according to the disclosure.

With reference to the figures, a Cartesian machine tool according to the disclosure is generally designated with the reference numeral 10.

The Cartesian machine tool 10 is of the type with a horizontal slide 11 and a machining head 12 supported in a cantilever manner by the slide 11.

The Cartesian machine tool 10 comprises:

a slide carriage 13, with respect to which the slide 11 can move horizontally with corresponding means of horizontal translation 14, a post 15, which comprises two opposing guiding columns 16 and 17 for the vertical movement of the slide carriage 13 with means of vertical translation 18.

Figure 2:
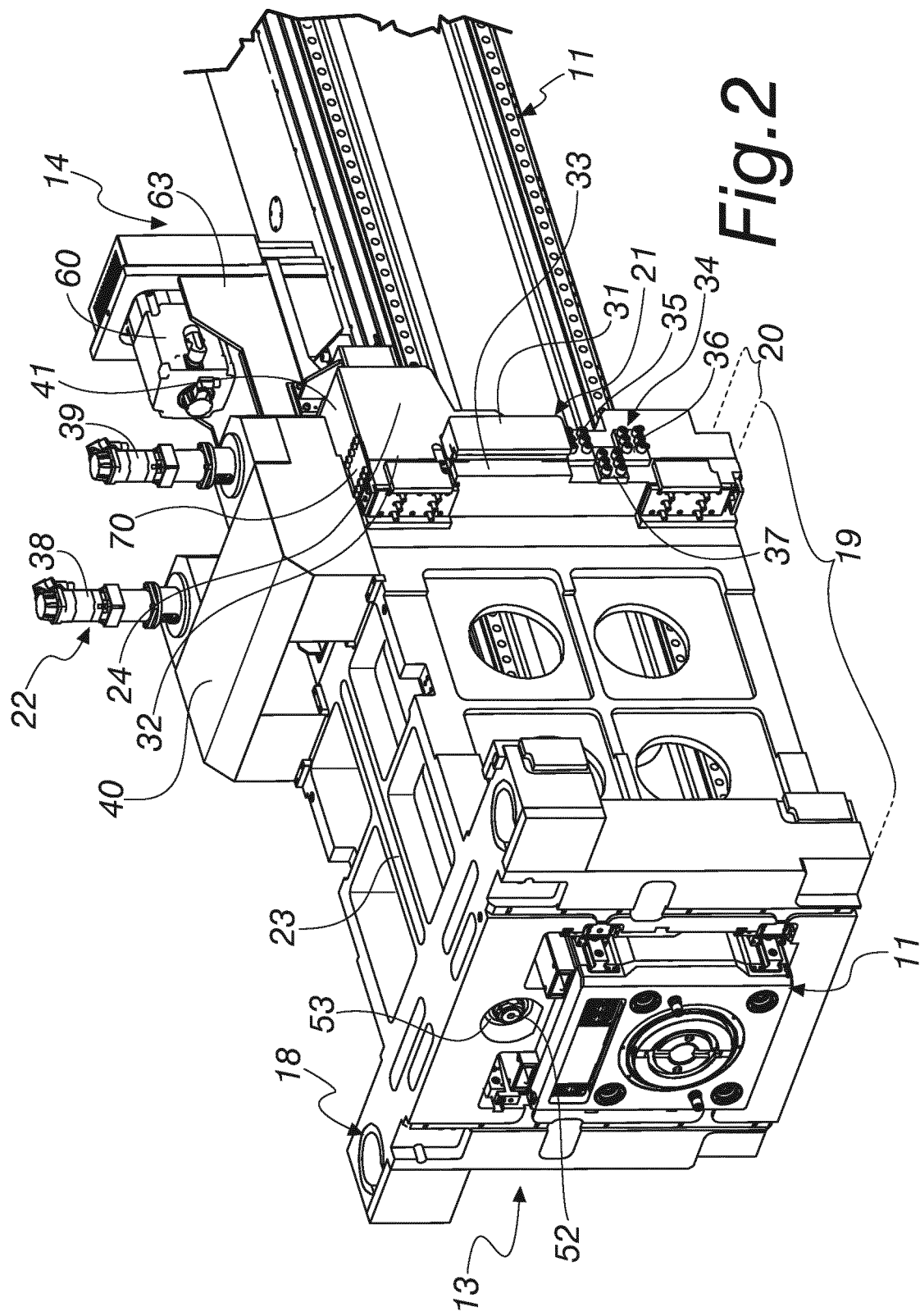
FIG. 2 is a perspective view of the carriage and the slide of a Cartesian machine tool according to the disclosure.

The peculiarity of the disclosure relates to the slide carriage 13 comprising, as can clearly be seen in FIG. 2:

a first front part 19, which is coupled to the post 15 with the means of vertical translation 18, a second rear part 20, which is coupled to the first part 19 with means of translation 21 in a transverse direction Y with respect to a direction X of motion of the slide 11 with respect to the carriage 13; the means of translation 21 between the first part 19 and the second part 20 are adapted to allow the inclination of the slide 11 in order to define an optimum configuration of use of the slide 11, and actuator means 22 for controlling the translation of the second part 20 with respect to the first part 19, in order to define an optimum configuration of use of the slide 11.

In particular the direction X is a horizontal direction, and the direction Y is a vertical direction.

The first part 19 of the slide carriage, coupled to the post 15 with the means of vertical translation 18, is constituted, for example, by a box-like body 23 inside which there is a through compartment for the slide 11.

The second part 20 is constituted by a frame 24 within which, similarly, the slide 11 slides.

Figure 3:
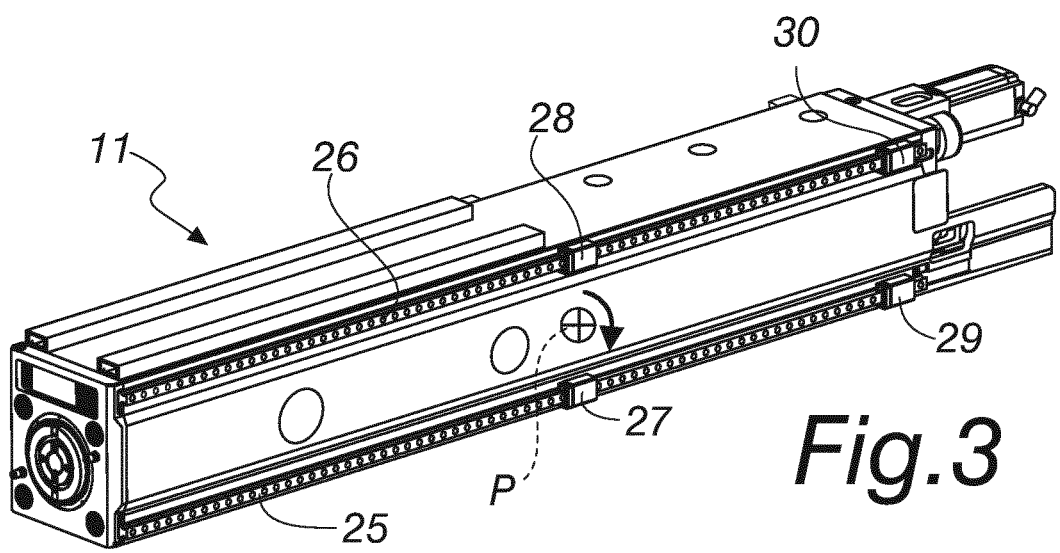
FIG. 3 is a perspective view of a slide of a Cartesian machine tool according to the disclosure.
Figure 4:
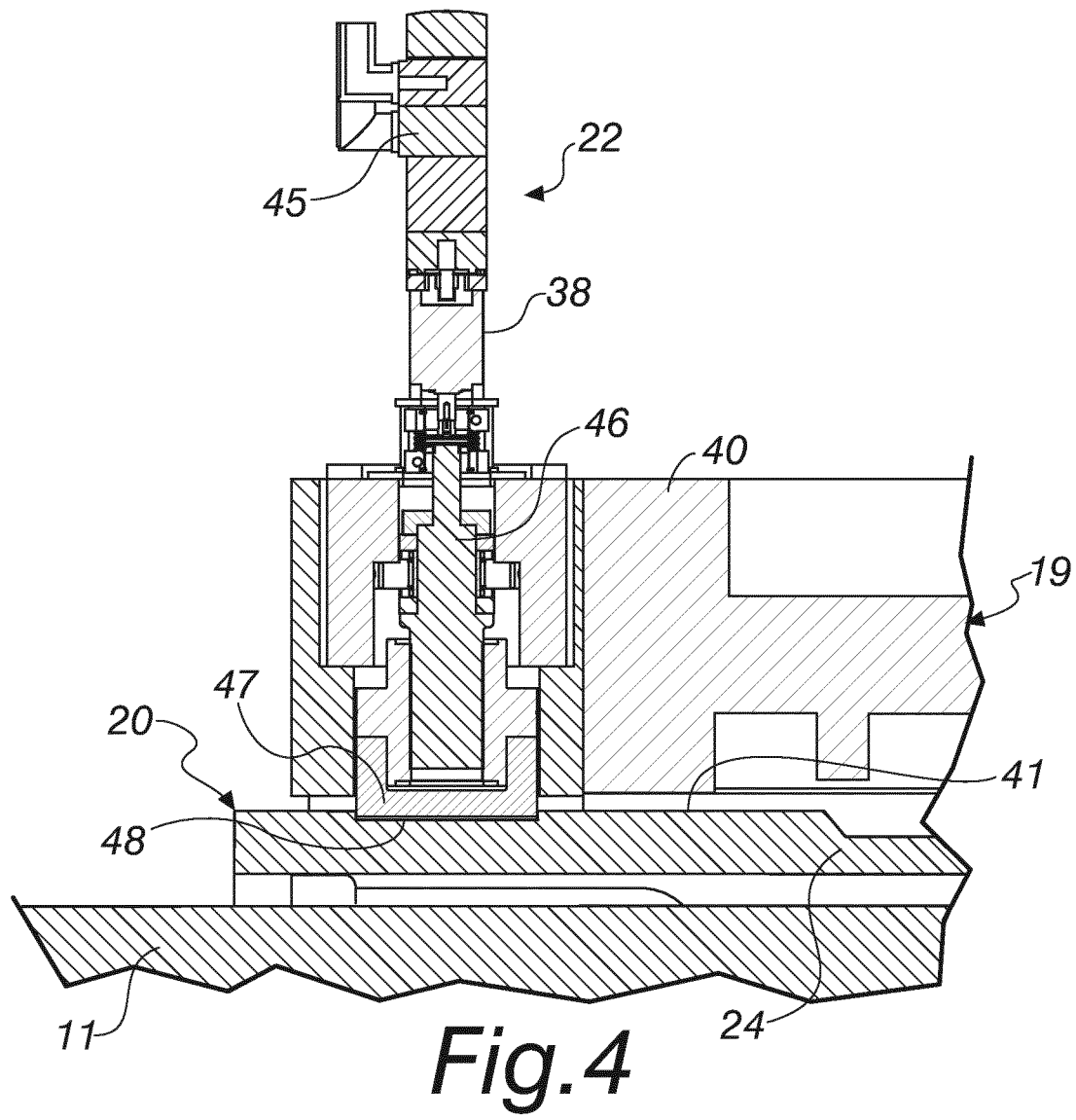
FIG. 4 is a cross-sectional side view of a detail of the slide according to the disclosure.

The means of horizontal translation 14 comprise at least one longitudinal guide, and for the purposes of example two longitudinal guides 25 and 26, for each side, right and left, of the slide 11; at least one slider, for example two sliders 27 and 28, fixed inside the first part 19 and at least one slider, for example two sliders 29 and 30, fixed inside the second part 20 are arranged so as to slide on each longitudinal guide 25 and 26; the guides and the sliders are clearly visible in FIG. 3.

Figure 7:
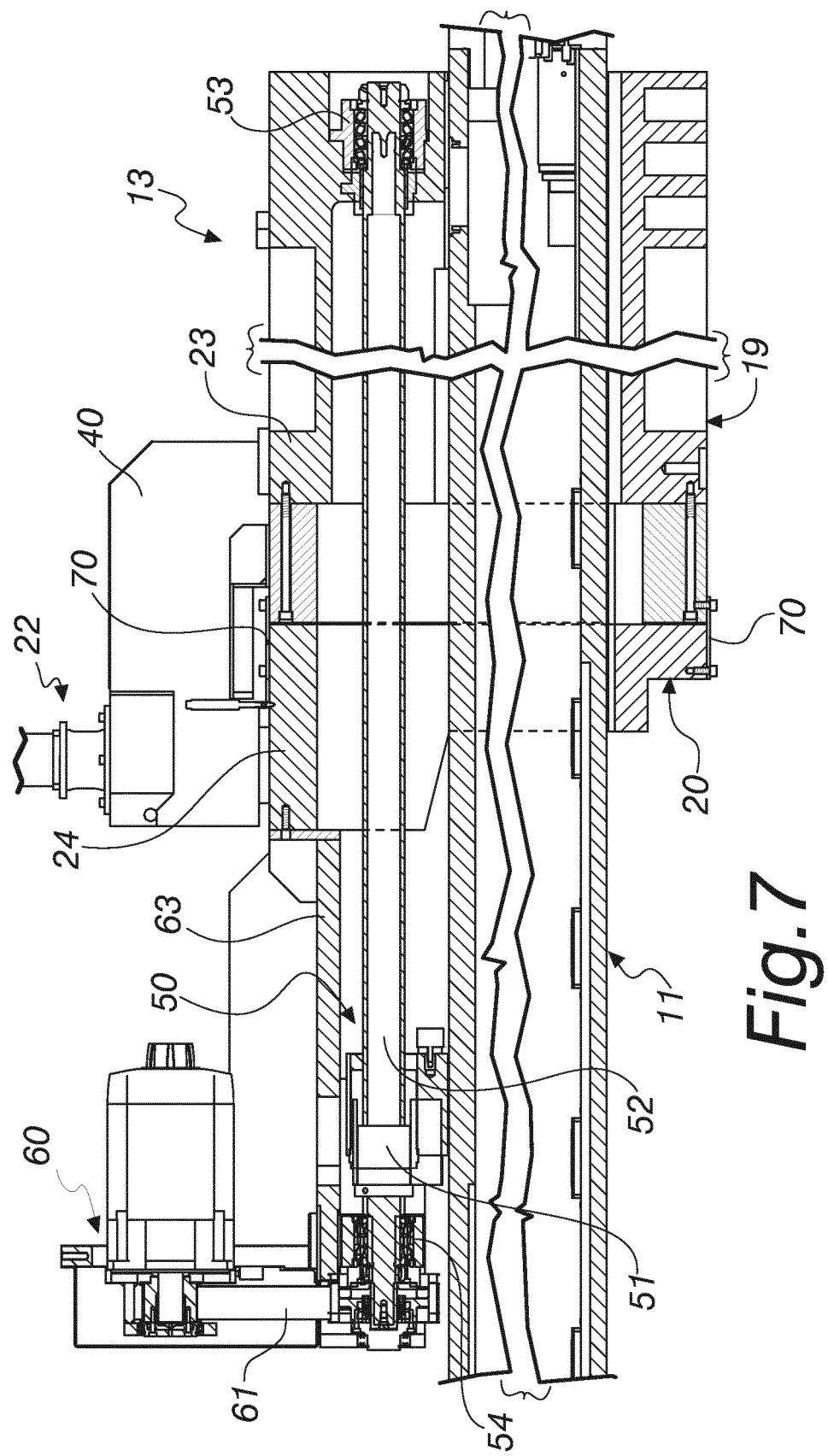
FIG. 7 is a portion of a longitudinal cross-sectional side view of the carriage and the slide.

The means of horizontal translation 14 of the slide 11 with respect to the slide carriage 13 also comprise a linear actuator of the type with a lead screw and an endless screw 50, in which the lead screw 51 is fixed to the slide 11, as in FIG. 7, while the endless screw 52 is supported in a front region by the first part 19 of the carriage 13, for example with a front bearing support 53, and in a rear region, with a rear bearing support 54, by the second part 20 of that carriage 13.

The screw 52 is rotated about its own main axis by a gearmotor 60 by way of a belt-and-pulley system 61.

The gearmotor 60 is supported by a corresponding tail bracket 63 which is integral with the second part 20.

The means of translation 21 of the second part 20 with respect to the first part 19 comprise two linear guiding systems 31 for the translation of each one of the right and left sides 32 of one part 20 with respect to the corresponding right and left sides 33 of the other part 19.

Each one of the linear guiding systems 31 is constituted, for example, by a planar roller guide.

The means of translation 21 comprise stroke limiters 34 in the direction Y.

The stroke limiters 34 comprise, for example, for each side of the two parts 19 and 20 of the carriage 13, two first blocks 35 and 36 which are fixed on each side for example of the second part, and a second intermediate block 37 which is fixed to the facing side of the first part 19, and is positioned with play between the first two blocks, as in FIG. 2.

The play, for example, can be of approximately 0.5 millimeters.

The stroke limiters 34 impede an excess relative translation between the two parts, the first part 19 and the second part 20, thus limiting the deformation that occurs on the slide 1 and on the guides 25 and 26 within safety limits.

The actuator means 22 are constituted, for the purposes of example, by two vertical-axis linear thrust actuators 38 and 39, which are fixed to a rear portion 40 of the first part 19 and are arranged to push downward from above on the upper face 41 of the second part 20.

The vertical-axis linear thrust actuators 38 and 39 each comprise an electric motor 45, which is fixed to the rear portion 40 of the first part 19 and is adapted to rotate a driven secondary shaft 46 which in turn supports a pusher body 47 by way of a threaded coupling, the rotation of the secondary shaft 46 causing the raising or lowering of the pusher body 47 according to the direction of rotation of the driven secondary shaft 46.

Corresponding centering recesses 48 are defined at the upper face 41 of the second part 20 on which the pusher bodies 47 push.

The linear thrust actuators 38 and 39, commanded automatically, act proportionally with respect to the cantilevered position of the machining head 12, i.e. the further the slide 11 is extracted from the slide carriage 13, the greater is the vertical lowering imposed by the linear actuators 38 and 39 on the second part 20.

Figure 5:
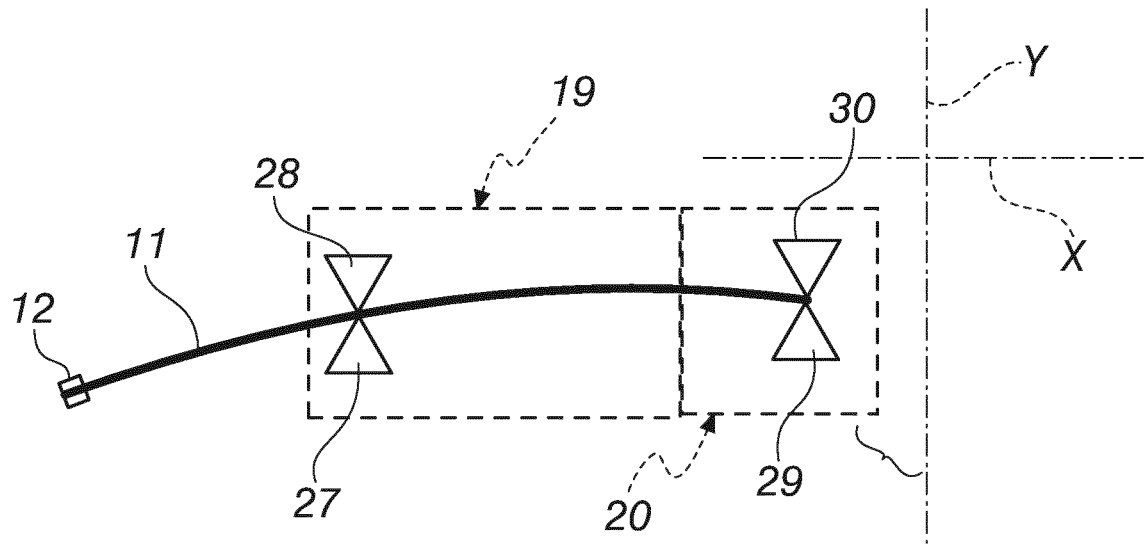
FIGS. 5 and 6 are schematic views of the operation of the slide carriage of the Cartesian machine tool according to the disclosure.
Figure 6:
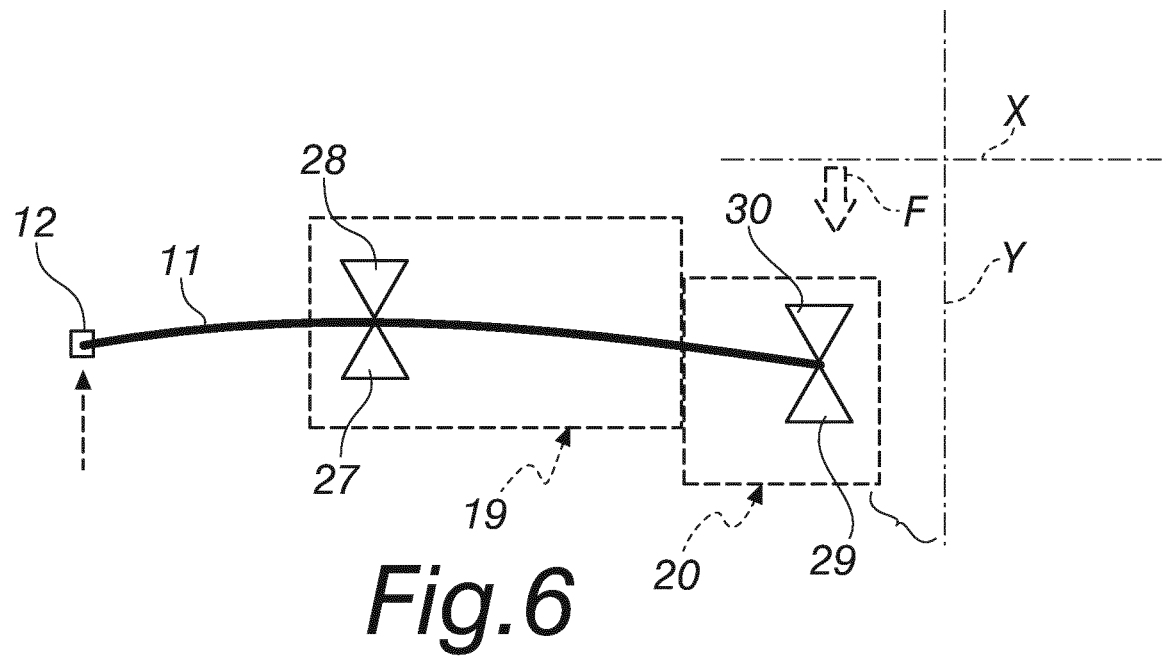

FIGS. 5 and 6 clearly and schematically show the operation of the machine 10 according to the disclosure.

FIG. 5 schematically shows a situation of lowering the machining head 12, owing to bending of the slide 11.

FIG. 6 schematically shows how the correct operating position of the machining head 12 is restored by way of the action of the actuator means 22, indicated by the arrow of the force F applied by such means, which produce the translation of the second part 20 downward with respect to the first part 19, such translation being of the order of fractions of a millimeter and within the limits imposed by the stroke limiters 34.

The action of the force F is transmitted from the second part 20 to the slide 11 by way of the sliders 29 and 30 of the second part 20 and the corresponding longitudinal guides 25 and 26 which are integral with the slide 11.

In order to automatically restore the starting configuration of the second part 20 with respect to the first part 19, there are elastic plates 70, for example made of metallic material, which are fixed astride the two parts, the first part 19 and the second part 20.

There can be, for example, four elastic plates, arranged symmetrically, two above and two below.

The disclosure also relates to a slide carriage 13 for machine tools of the type with a horizontal slide 11 and a machining head 12 supported in a cantilever manner by the slide 11, the latter being able to move horizontally with corresponding means of horizontal translation 14; such slide carriage 13 being characterized in that it comprises, as described above:

a first front part 19, which is coupled to the post 15 with the means of vertical translation 18, a second rear part 20, which is coupled to the first part 19 with means of translation 21 in a transverse direction Y with respect to a direction X of motion of the slide 11 with respect to the carriage 13, the means of translation 21 between the first part 19 and the second part 20 being adapted to allow the inclination of the slide 11 in order to define an optimum configuration of use of the slide 11, actuator means 22 for controlling the translation of the second part 20 with respect to the first part 19, in order to define an optimum configuration of use of the slide 11.

In practice it has been found that the disclosure fully achieves the intended aim and advantages.

In fact, in order to achieve compensation of the drop of the slide 11, the slide carriage 13 is divided into two pieces, a first front part 19 and a second rear part 20, which act to compensate the drop of the slide 11 by moving vertically with respect to each other.

In particular, the first part 19 is moved by the recirculating-ball screws of the means of vertical translation 18, which establish the operating position of the spindle axle, while the second part 20 is moved relative to the first part 19 by way of the actuator means 22, as described above.

As has been seen, the second part 20 is coupled to the first part 19 by way of adapted vertically-sliding guide mechanisms.

Since in any case these are small compensations, which do however cause a deformation of the slide 11, it is possible to continuously compensate the position of the front of the slide as a function of its travel outward.

Also central to the system are the actuator means 22 that produce the rotary motion of the slide 11 with respect to a point of instantaneous rotation P, at the sliders 27 and 28 inside the first part 19 of the carriage 13.

With respect to the known art in which the carriage is supported on a single side by way of a post constituted by a single column, the Cartesian machine tool 10 according to the disclosure encloses the carriage 13 on both sides, thus producing only symmetrical deformations, giving the system a deformed configuration that is easily calculable and predictable.

The system defined by the Cartesian machine tool 10 according to the disclosure, integrated with numerical control, achieves the aim of correcting the errors of positioning owing to structural deformations of the elements of the slide 11 and overcomes the drawbacks of conventional systems by limiting to the minimum the geometric errors that are difficult to control.

The symmetry of the means of translation 18 and of the columns 16 and 17 of the post 15 cooperate significantly in optimizing the functionality of the disclosure.

Therefore, with the disclosure a Cartesian machine tool has been devised that is capable of restoring the correct configuration of a machining head, limiting to the minimum the deformations of the sliding guides of the slide, and in general without introducing deformations into the means of guiding the movable elements of the machine.

What is more, with the disclosure a Cartesian machine tool has been devised in which the position of the machining head can be rapidly corrected with respect to any deviations with respect to a preset position.

Furthermore, with the disclosure a Cartesian machine tool has been devised with operational performance levels that are not lower than conventional Cartesian machine tools.

Furthermore, with the disclosure a suitable slide carriage for Cartesian machine tools has been devised.

The disclosure thus conceived is susceptible of numerous modifications and variations, all of which are within the scope of the appended claims. Moreover, all the details may be substituted by other, technically equivalent elements.

In practice the components and the materials employed, provided they are compatible with the specific use, and the contingent dimensions and shapes, may be any according to requirements and to the state of the art.

The disclosures in Italian Patent Application No. 102016000027888 (UA2016A001742) from which this application claims priority are incorporated herein by reference.

The invention claimed is:

1. A Cartesian machine tool with a horizontal slide and a machining head supported in a cantilever manner by said slide, the Cartesian machine tool comprising:
    a slide carriage, with respect to which said slide can move horizontally with corresponding first means of translation in a horizontal direction, and
    a post, which comprises two opposing guiding columns for the vertical movement of said slide carriage with a second means of translation in a vertical direction,
    wherein said slide carriage comprises:
        a first part at the front of the slide carriage, which is coupled to said post with said second means of translation,
        a second part at the rear of the slide carriage, which is coupled to said first part with a third means of translation in a transverse direction with respect to a direction of motion of said slide with respect to said carriage, the translation between said first part and said second part allowing-being configured to allow the inclination of said slide, and
        actuator means for controlling the translation of said second part with respect to said first part.

2. The Cartesian machine tool according to claim 1, wherein said first part of the slide carriage, coupled to said post with the means of vertical translation, is constituted by a body inside which there is a through compartment for said slide.

3. The Cartesian machine tool according to claim 1, wherein said second part is constituted by a frame within which said slide slides.

4. The Cartesian machine tool according to claim 1, wherein said means of horizontal translation comprise at least one longitudinal guide for each side, right and left, of the slide, at least one slider fixed inside the first part and at least one slider fixed inside said second part being arranged so as to slide on each longitudinal guide.

5. The Cartesian machine tool according to claim 4, wherein said means of translation of the second part with respect to said first part comprise at least one linear guiding system for the translation of each one of the right side and the left side of one part with respect to the corresponding right side and left side of the other part.

6. The Cartesian machine tool according to claim 5, wherein said at least one linear guiding system is constituted by a planar roller guide.

7. The Cartesian machine tool according to claim 1, wherein said third means of translation comprise stroke limiters in the transverse direction.

8. The Cartesian machine tool according to claim 1, wherein said actuator means are constituted by at least one vertical-axis linear thrust actuator, the at least one vertical-axis linear thrust actuator is fixed to a rear portion of the first part and is arranged so as to push downward from above onto a rear face of said second part.

9. The Cartesian machine tool according to claim 1, wherein said means of horizontal translation of the slide with respect to the slide carriage comprise a linear actuator of the type with a lead screw and an endless screw.

10. The Cartesian machine tool according to claim 9, wherein said lead screw is fixed to the slide, while the endless screw is supported in a front region by the first part, with a front bearing support, and in a rear region by the second part, with a rear bearing support.

11. A slide carriage for machine tools of the type with a horizontal slide and a machining head supported in a cantilever manner by said slide, which can move horizontally with corresponding means of horizontal translation, said slide carriage comprising:
    a first part at the front of the slide carriage, coupled to a post with a first means of translation in a vertical direction,
    a second part at the rear of the slide carriage, coupled to said first part with a second means of translation in a transverse direction with respect to a direction of motion of said slide with respect to said carriage, said second means of translation between said first part and said second part being configured to allow the inclination of said slide, and
    actuator means for controlling the translation of said second part with respect to said first part.

* * * * *